US012195336B1

(12) United States Patent
Al-Enizi et al.

(10) Patent No.: US 12,195,336 B1
(45) Date of Patent: Jan. 14, 2025

(54) CARBON NANOMATERIAL DERIVED FROM HUMAN WASTE

(71) Applicant: KING SAUD UNIVERSITY, Riyadh (SA)

(72) Inventors: Abdullah Mussad Al-Enizi, Riyadh (SA); Sushil Shivaji Sangale, Nanded (IN); Siddheshwra Dadarao Raut, Nanded (IN); Yogesh Tukaram Nakate, Nanded (IN); Tabassum Begum Siddiqui, Nanded (IN); Shoyebmohamad Fattemohamad Shaikh, Riyadh (SA); Rajaram Sakharam Mane, Nanded (IN)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/672,270

(22) Filed: May 23, 2024

(51) Int. Cl.
  *C01B 32/15* (2017.01)
  *C03C 17/22* (2006.01)

(52) U.S. Cl.
  CPC .............. *C01B 32/15* (2017.08); *C03C 17/22* (2013.01); *C01P 2002/01* (2013.01); *C01P 2002/72* (2013.01); *C01P 2002/82* (2013.01); *C01P 2004/03* (2013.01); *C01P 2004/04* (2013.01); *C01P 2004/64* (2013.01); *C01P 2006/12* (2013.01); *C01P 2006/16* (2013.01); *C03C 2218/112* (2013.01); *C03C 2218/32* (2013.01)

(58) Field of Classification Search
  CPC ... C01B 32/15; C03C 17/22; C03C 2218/112; C03C 2218/32; C01P 2002/01; C01P 2002/72; C01P 2002/82; C01P 2004/03; C01P 2004/04; C01P 2004/64; C01P 2006/12; C01P 2006/16
  See application file for complete search history.

(56) References Cited

FOREIGN PATENT DOCUMENTS

| CN | 107275650 A | 10/2017 |
| CN | 107492657 A | 12/2017 |
| CN | 110813362 A | 2/2020 |
| CN | 111056547 A | 4/2020 |

OTHER PUBLICATIONS

Nakate, et al., Human urine-derived naturally heteroatom doped highly porous carbonaceous material for gas sensing and supercapacitor applications, Ceramics International 2022; 48: 28942-28950 with Supporting Information (Year: 2022).*
Chaudhari, et al., Heteroatom-doped highly porous carbon from human urine, Scientific Reports 2014; 4: 5221, pp. 1-10 (Year: 2014).*
Essner, et al., Pee-dots: biocompatible fluorescent carbon dots derived from the upcycling of urine, Green Chem. 2016; 18: 243-250 (Year: 2016).*
Chaudhari, et al., "Heteroatom-doped highly porous carbon from human urine," Scientific Reports, 4: 5221, Jun. 9, 2014.

* cited by examiner

*Primary Examiner* — Daniel C. McCracken
(74) *Attorney, Agent, or Firm* — Nath, Goldberg & Meyer; Joshua B. Goldberg

(57) ABSTRACT

Human urine-based carbon nanoparticles (HUC NPs) and synthesized using a spray pyrolysis solution process. The HUC NPs are adherent, nanocrystalline, and semiconducting over non-conducting/conducting substrates for gas sensors, supercapacitors, and electrochemical catalysis applications. Additionally, the HUC NPs may be used as catalysts in a multi-element reaction of chromene derivatives with≥95% product yield at room temperature using 1:1 water:ethanol as a green solvent.

14 Claims, 11 Drawing Sheets

CARBON NANOMATERIAL DERIVED FROM HUMAN WASTE

BACKGROUND

Field

The disclosure of the present patent application relates to carbon nanomaterials and particularly to a method of deriving carbon nanomaterials from human waste.

Description of Related Art

Carbon quantum dots, carbon nanowires, carbon nanotubes, graphene/graphene oxide, and the like have become encouraging nanomaterials in science and technological research because of their exclusive physical, chemical, and mechanical assets. Carbon nanomaterials are desired due to their unique structure, and excellent physical as well as electronic/electrochemical properties. For example, various carbon nanomaterials have been shown to have high specific surface area, small dimension, excessive electron mobility, non-toxicity, and abundance; further, the accessibility of various chemical and physical synthesis techniques providing different morphologies, stability in both acidic and alkaline phase, and several crystallographic forms provide for a myriad of applications.

Carbon nanomaterials are classified on their dimensions and are confined to the nanoscale range (<100 nm), including zero-dimensional nanoparticles, one-dimensional nanowires or nanotubes, and two-dimensional nanosheets to three-dimensional structures and the exceptionality of each lattice structure leads to multifaceted physicochemical, and optoelectronic properties. Furthermore, carbon nanomaterials have attracted enormous attention in electrochemistry, particularly as gas sensors due to their extraordinary π-system within consistent equality of electrons within valence as well as conduction bands (hybridization of oxygen $sp^2$ states with oxygen $sp^3$ states in the valence band, and pure 3d states in the conduction band). Due to high electron mobility and catalytic activity, carbon is the most preferred electrode material in supercapacitors, batteries, hydrogen storage, solar cells, fuel cells, water treatment, biomedical, and gas sensor device technologies. Recently, the fabrication of human urine carbon nanoparticles (HUC NPs) has received tremendous attention in energy storage applications. The interest is also heightened due to the biomass of human urine and a desire to convert renewable polluting waste on earth which is associated with the existence of the heteroatoms like oxygen, sulphur, nitrogen, phosphorous, sodium, potassium, and other elements to something more useful. These properties endow different functionalities, thereby, influencing their performance in devices where they are applied. Moreover, carbon-based NPs with well-designed structure, porosity, and convenient surface functionality as functions of eco-friendly catalysts due to their efficiency in advanced redox method, whose low-temperature and easy development on non-conducting/conducting substrate are scarce and challenging too.

Thus, a carbon nanomaterial derived from human waste solves the aforementioned problems is desired.

SUMMARY

A method of making carbon nanoparticles is provided, including providing a human urine sample and a substrate; ultrasonically cleaning the substrate; using spray pyrolysis to spray the human urine sample onto the substrate at a temperature between about 100° C. and about 400° C. to obtain a film deposited on the substrate; allowing the film deposited on the substrate to cool to about 27° C.; and carbonizing the film deposited on the substrate at a temperature between about 300° C. and about 500° C. to obtain the carbon nanoparticles. The substrate may be either a conducting or a non-conducting substrate.

In certain embodiments, the substrate may be a conducting substrate, including but not limited to nickel-foam, copper-foam, stainless steel, indium-doped tin oxide, fluorine-doped tin oxide, conducting zinc oxide and carbon cloth. In other embodiments, the substrate may be a non-conducting substrate, including but not limited to soda-lime glass, hard plastic and ceramic alumina.

In certain embodiments, the method may produce carbon nanoparticles in the form of a thin film of between about 1 and about 10 microns adhered to the substrate. The resulting film/nanoparticles may be useful for a wide variety of applications, including as gas sensors and as catalysts for the creation of chromene derivatives.

These and other features of the present subject matter will become readily apparent upon further review of the following specifications.

DETAILED DESCRIPTION

Figure 1A:
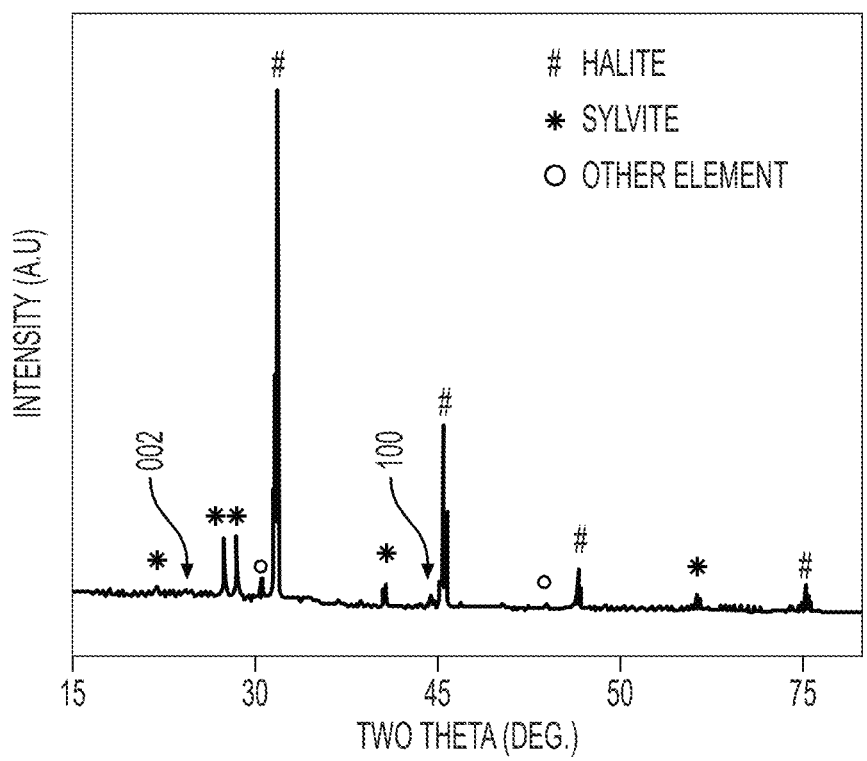
FIGS. 1A-1H depict HUC NP's (1A) X-ray diffraction pattern, (1B) Raman spectrograph, (1C) Fourier transform infrared spectrograph, (1D) Binding energy survey photoemission spectrograph, (1E) Field Emission-Scanning electron micrograph, (1F) High-resolution-Transmission electron micrograph, and (1G-1H) graphs illustrating the Adsorption-desorption isotherm image.
Figure 1B:
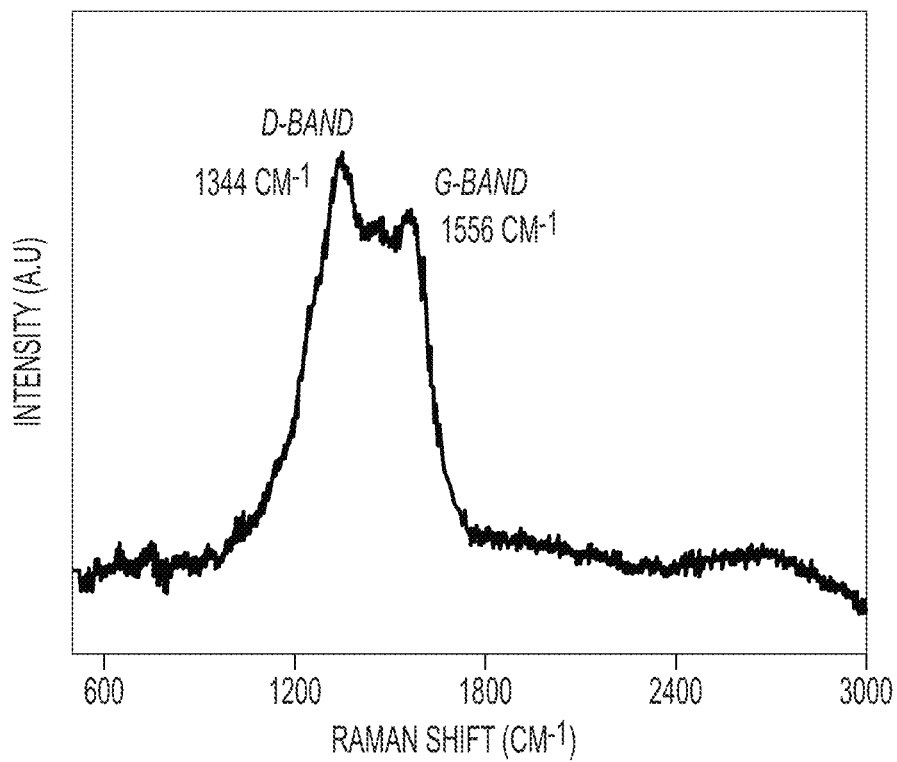
Figure 1C:
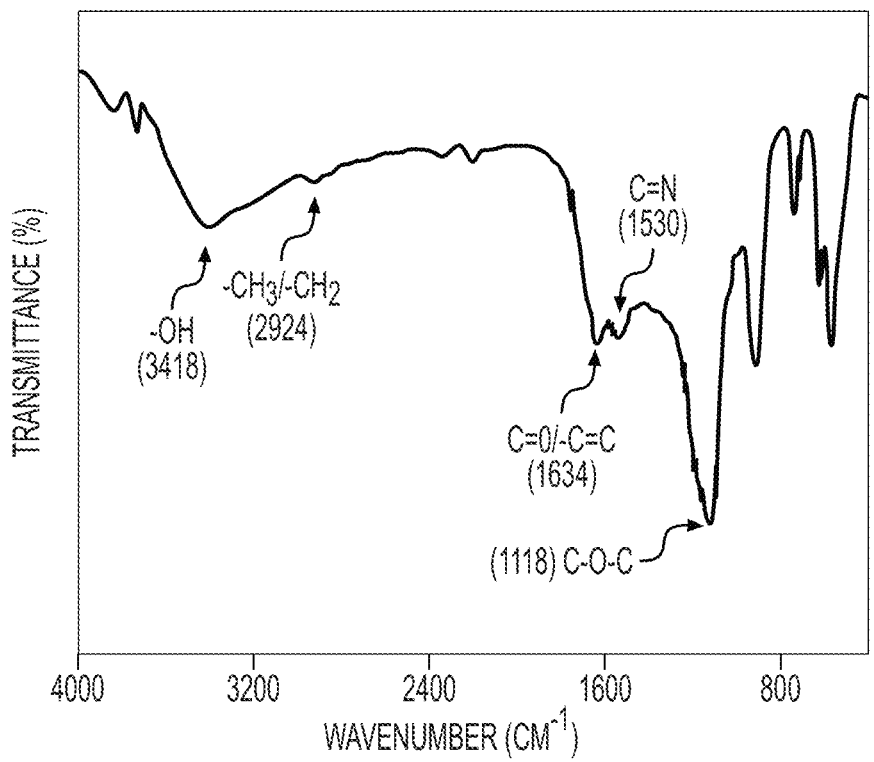
Figure 1D:
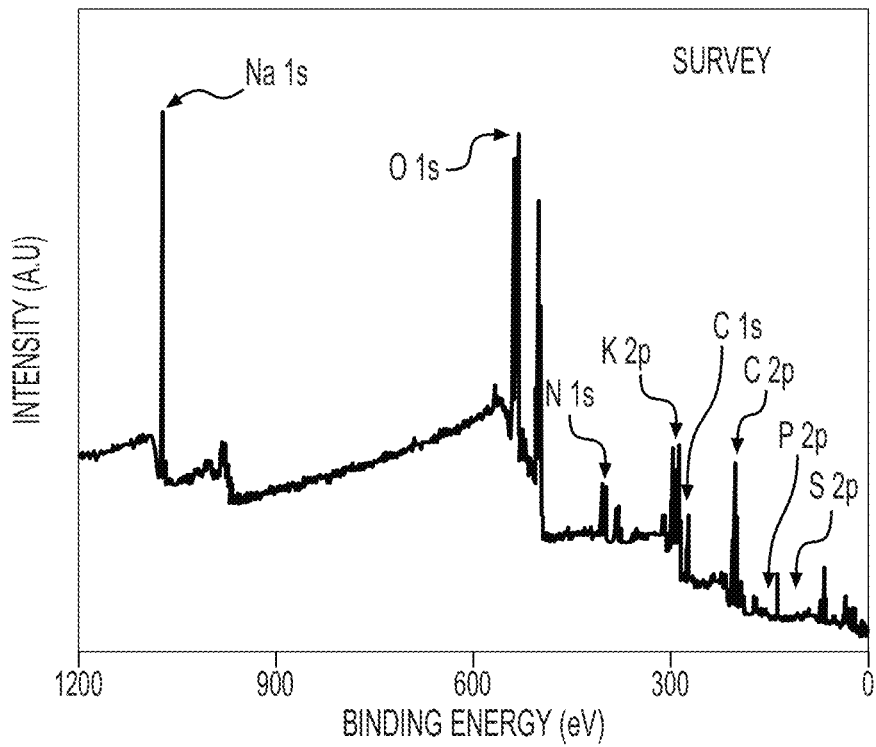
Figure 1E:
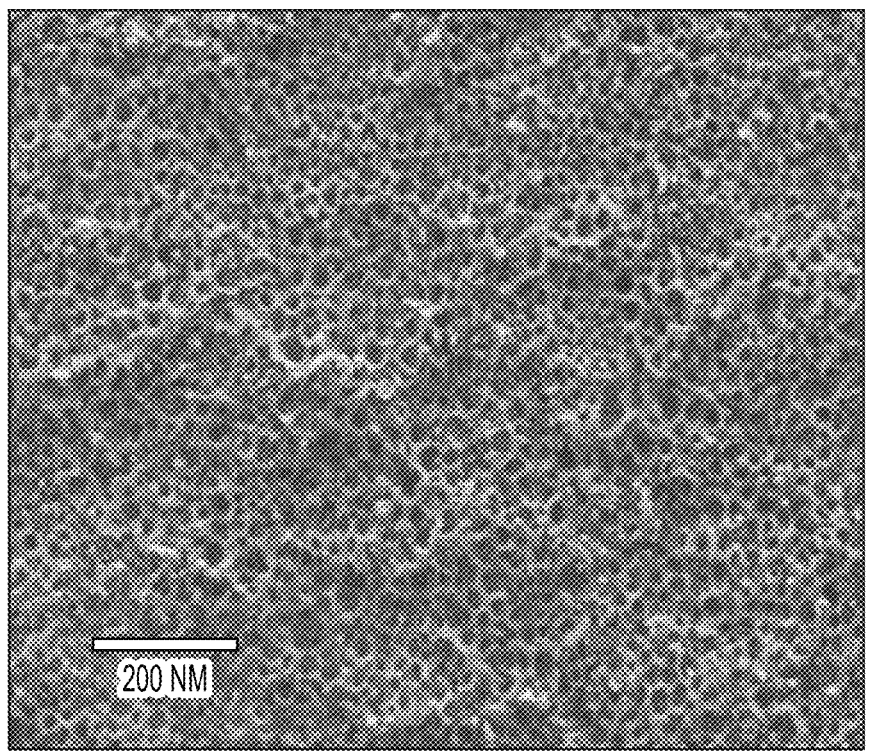
Figure 1F:
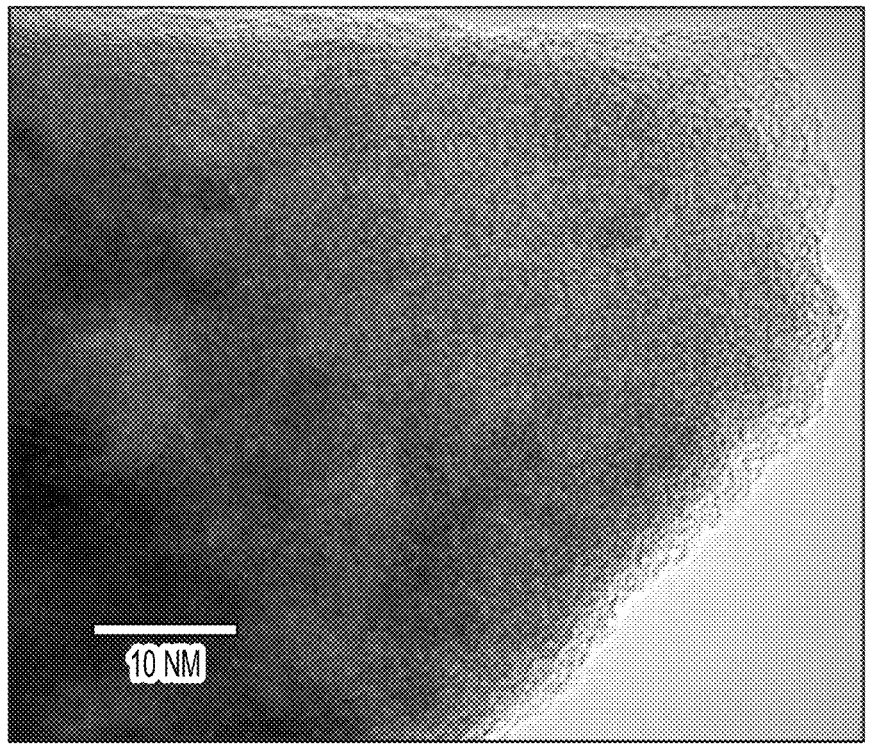
Figure 1G:
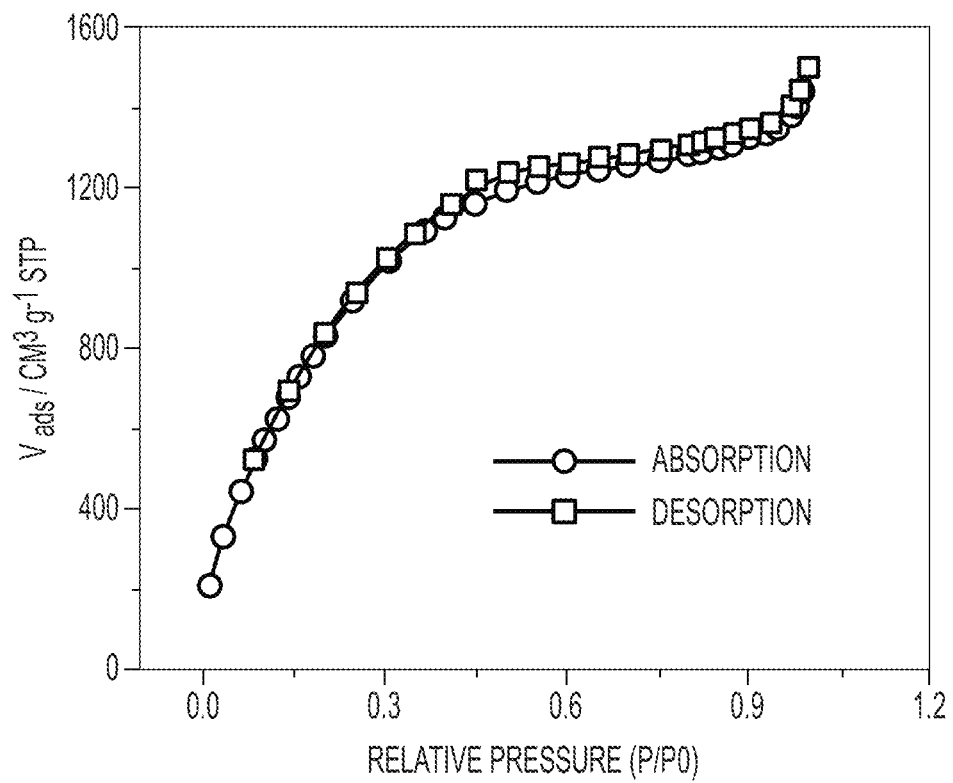
Figure 1H:
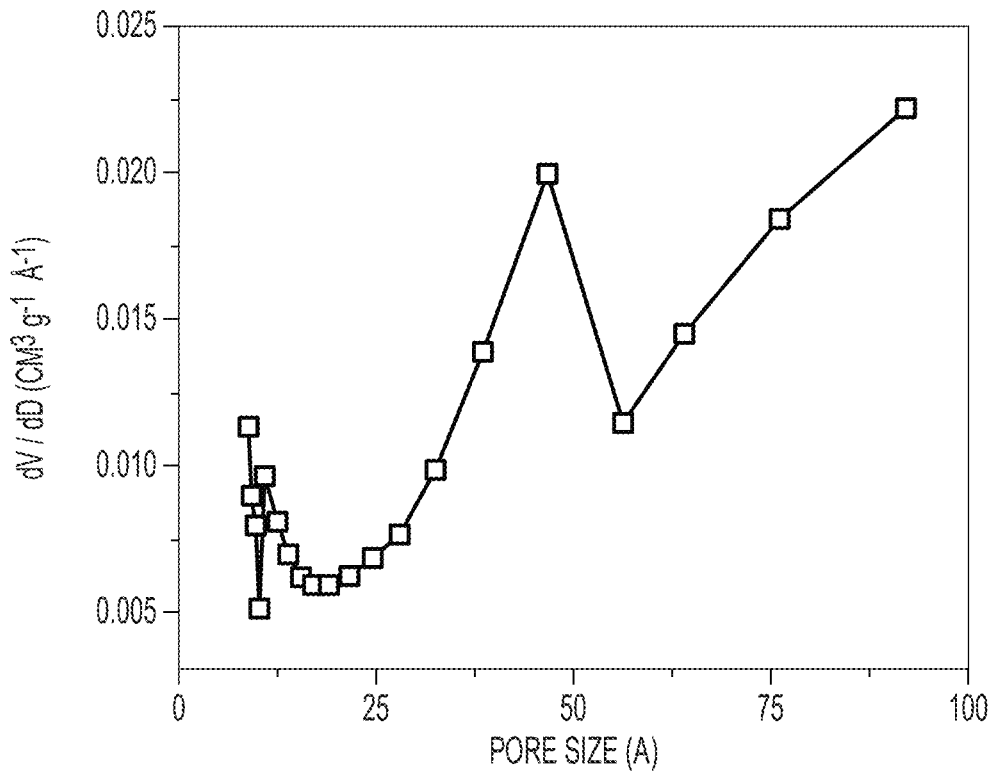

The following definitions are provided to understand the present subject matter and for construing the appended patent claims.

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components and that the processes of the present teachings can also consist essentially of, or consist of, the recited process steps.

It is noted that, as used in this specification and the appended claims, the singular forms "a", "an", and "the" include plural references unless the context dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur and that the description includes instances where said event or circumstance occurs and instances in which it does not.

It will be understood by those skilled in the art of any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters outlined in the following specification and attached claims are approximations that may vary depending upon the desired properties sought to be obtained. At the very least, each numerical parameter should at least be construed in light of the number of reported significant digits and by applying ordinary rounding techniques.

A method of making carbon nanoparticles is provided, including providing a human urine sample and a substrate; ultrasonically cleaning the substrate; using spray pyrolysis to spray the human urine sample onto the substrate at a temperature between about 100° C. and about 400° C. to obtain a film deposited on the substrate; allowing the film deposited on the substrate to cool to about 27° C.; and carbonizing the film deposited on the substrate at a temperature between about 300° C. and about 500° C. to obtain the carbon nanoparticles. The substrate may be either a conducting or a non-conducting substrate.

In certain embodiments, the substrate may be a conducting substrate, including but not limited to nickel-foam, copper-foam, stainless steel, indium-doped tin oxide, fluorine-doped tin oxide, conducting zinc oxide and carbon cloth. In other embodiments, the substrate may be a non-conducting substrate, including but not limited to soda-lime glass, hard plastic and ceramic alumina.

In certain embodiments, where the substrate is a conducting substrate, the ultrasonic cleaning may include ultrasonically cleaning the substrate for about 30 minutes sequentially in 1M hydrochloric acid, followed by distilled water and methanol.

In certain embodiments, where the substrate is non-conducting, the ultrasonic cleaning may include ultrasonically cleaning the substrate for about 30 minutes sequentially in detergent-added distilled water and acetone.

In certain embodiments, spray pyrolysis may include spraying between about 5 mL and about 20 mL of the human urine sample onto the substrate at a temperature between about 100° C. and about 400° C. to obtain the film deposited on the substrate.

In certain embodiments, spray pyrolysis may include spraying the human urine sample through a nozzle positioned about 20 to 30 cm from the substrate.

In certain embodiments, spray pyrolysis may use an airflow rate of between about 15 to about 20 liters per minute.

In certain embodiments, spray pyrolysis is performed for a period of about 5 to about 7 minutes; wherein the carbon nanoparticles form a film layer adhered to the substrate; and wherein the film layer has a thickness of about 1 to about 10 microns.

In certain embodiments, the resulting carbon nanoparticles have a thickness of between about 1 and about 10 microns.

In certain embodiments, the resulting carbon nanoparticles consist of carbon, potassium, sodium, oxygen, and sulphur.

In certain embodiments, the resulting carbon nanoparticles are mesoporous with an average pore size of about 45.03 Å and a specific surface area of about 1238 $m^2g^{-1}$.

In certain embodiments, the method may produce carbon nanoparticles in the form of a thin film of between about 1 and about 10 microns adhered to the substrate. The resulting film/nanoparticles may be useful for a wide variety of applications, including as gas sensors and as catalysts for the creation of chromene derivatives.

In further embodiments, carbon nanoparticles prepared according to the present methods may be useful to detect the presence of methanol when exposed to a gaseous mixture at room temperature.

In yet further embodiments, carbon nanoparticles prepared according to the present methods may be useful to catalyze a multi-element reaction to produce a chromene derivative comprising mixing the carbon nanoparticles with 4-hydroxycoumarin, 3-Chlorobenzaldehyde, and malononitrile.

Human waste, i.e. urine, is a universal unused waste material that is regularly disposed of from the human body. In this investigation, an economically beneficial, sustainable, and novel route to synthesize mesoporous human urine carbon nanoparticles (HUC NPs) was developed. The as-synthesized HUC NPs are envisaged for their structural elucidation, morphology evolution, crystal phase, functional bonding, and elemental composition analyses through various sophisticated technologies. The as-synthesized HUC NPs over non-conducting/conducting substrate as the film is utilized for the gas sensor, oxygen evolution reaction, and catalysis applications. This natural waste material with several applications has the potential for both protecting the environment and for industrial applications.

Presented herein is a scalable and eco-friendly method to produce nanocrystalline and porous HUC NPs from the most abundant polluting wastes on earth i.e. urine which is free from the use of high-quality vacuum systems and expensive instrument technologies. The rate of HUC NPs with density can be precisely controlled. There are virtually no limitations on the substrate materials or dimensions of HUC NPs. As—synthesized HUC NPs on non-conducting/conducting substrates are nanocrystalline, semiconducting, and mesoporous for gas sensor, OER, and catalysis applications.

The carbon nanomaterial derived from human waste may be better understood because of the following examples.

Example 1

Preparation of Human Urine Carbon Nanoparticles

Synthesis of mesoporous, nanocrystalline, and semiconducting HUC NPs over a non-conducting or conducting substrate like nickel foam or a soda-lime glass substrate was performed using a spray pyrolysis solution process. In detail, urine as a raw organic precursor was collected from healthy humans in a wide-mouth plastic bottle (falcon tube). Urine contains urea, potassium, sodium, chloride, and other organic/inorganic compounds and ions along with 95% of water. The collected urine samples exhibited an average pH between 6 to 8. The nickel foam and soda-lime glass substrates were used to receive deposits of HUC NPs by a spray pyrolysis solution process.

Before spraying, the nickel foam was ultrasonically cleaned for 30 min sequentially in 1 M hydrochloric acid, distilled water, and methanol. Similarly, the glass substrate was ultrasonically cleaned for 30 minutes sequentially in detergent-added distilled water and acetone. Using the spray pyrolysis technique, a urine precursor of 5-20 mL was sprayed primarily throughout a glass nozzle. The distance between substrate-to-nozzle was 20-30 cm. The substrate temperature was adjusted from 100° C. to 400° C., with a heating rate of 10° C. per minute with programable temperature control unit, and the airflow rate was maintained at 15-20 $L.min^{-1}$. The spraying was conducted in a closed, locked compartment, as hazardous and toxic fumes formed as byproducts were removed by an exhaust. Afterward, films were removed when the temperature approached room temperature (i.e. 27° C.) to avoid any cracking effect. The deposited films were yellowish in appearance. The uniform films deposited on glass substrate/nickel foam were carbonized at a temperature from 300° C.-500° C. and then applied for gas sensor, OER, and catalysis applications. Before employing them in applications, the films were characterized for their structure, morphology, and phase purity.

Example 2

Gas Sensor Applications

Figure 2:
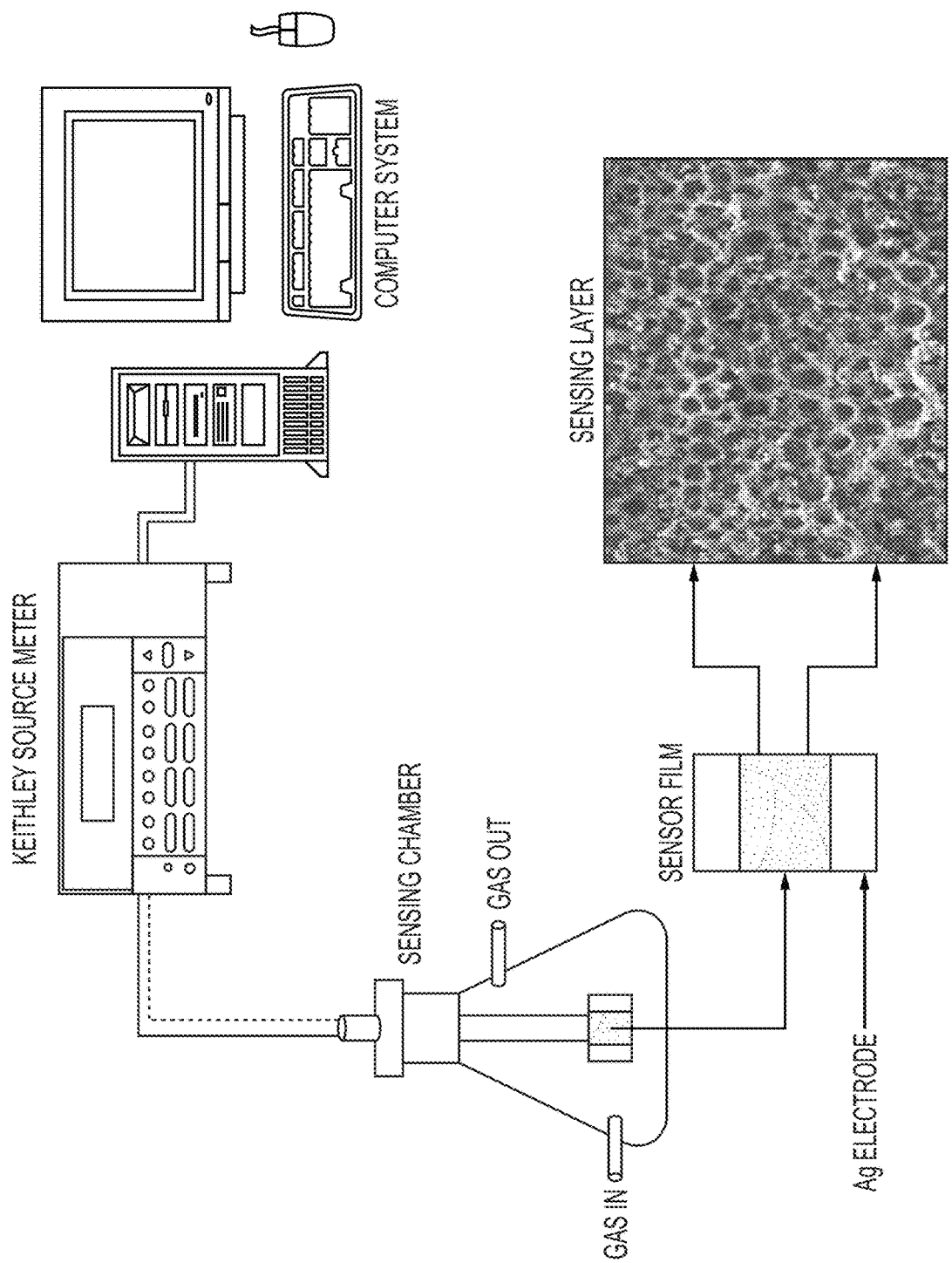
FIG. 2 depicts a schematic view of the gas sensor set-up used for gas sensing applications.
Figure 3A:
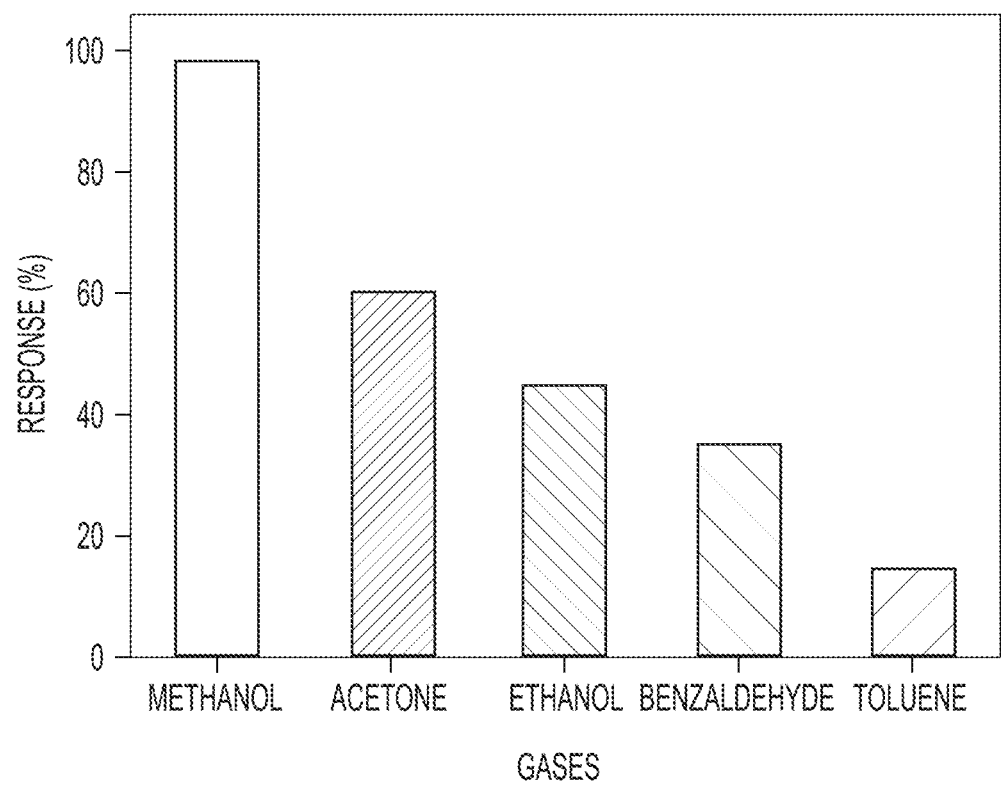
FIGS. 3A-3F depict HUC NP sensor results towards methanol for (3A) the selectivity of several volatile organic compounds performed at room temperature, (3B) dynamic response and recovery curves, (3C) repeatability towards methanol at 100 ppm concentration, (3D) response for several methanol concentration levels (10-100 ppm), and (3F) long-term stability test.

The gas sensor capabilities of HUC NPs were tested by flowing gas molecules over the HUC NPs surfaces, revealing adsorption/desorption processes through a charge transfer mechanism which is based on variation in the electrical resistance. The schematic sensor unit consists of a simple glass chamber with a volume of capability 250-300 mL and is shown in FIG. 2. By using an automated computer-coupled RS232 interface digital Keithley® 6514 source system, we measured variation in sensor resistance for time. The as-prepared HUC NPs sensor obtained using the spray pyrolysis solution process on a soda-lime glass slide substrate with 10 mm×10 mm exact, as described in Example 1, was placed between two electrical contacts (each electrode of 2.5 mm width) formed with the help of silver paste for sensor measurement. Before starting the experiment, the sensor unit was dried with warm and dry air to avoid the effect of moistness on the sensing result. The activity of the HUC NPs sensor on exposure to various volatile organic compounds viz. ethanol, methanol, benzaldehyde, acetone, and toluene gases over the sensor surface is shown in FIG. 3A.

Figure 3B:
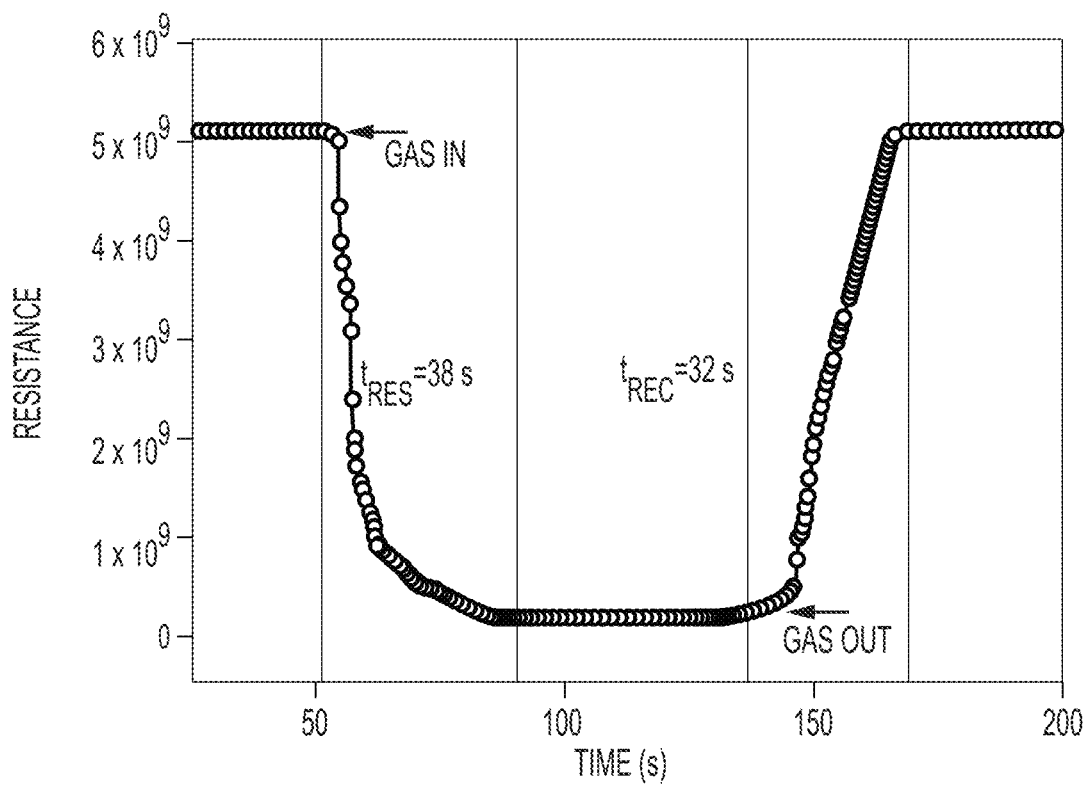
Figure 3C:
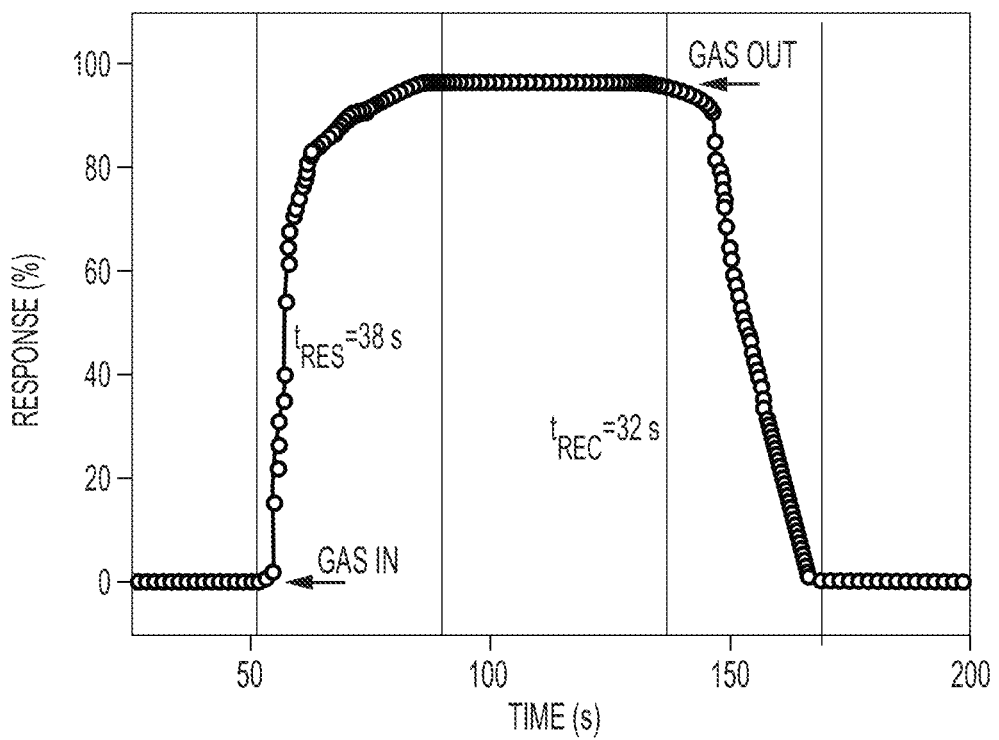
Figure 3D:
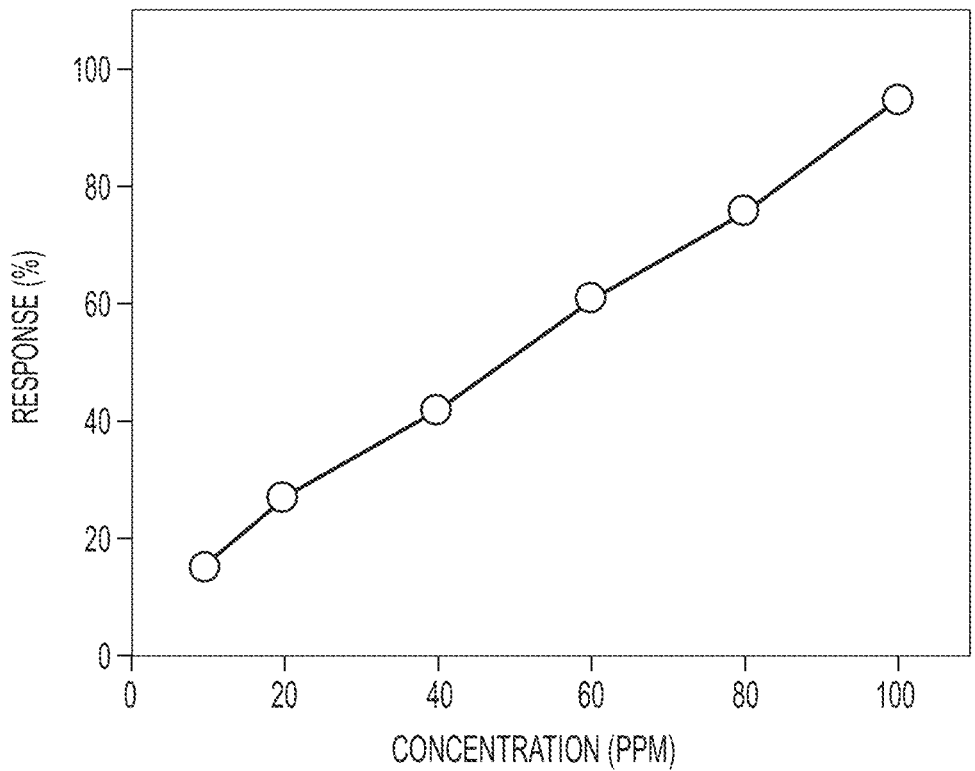
Figure 3E:
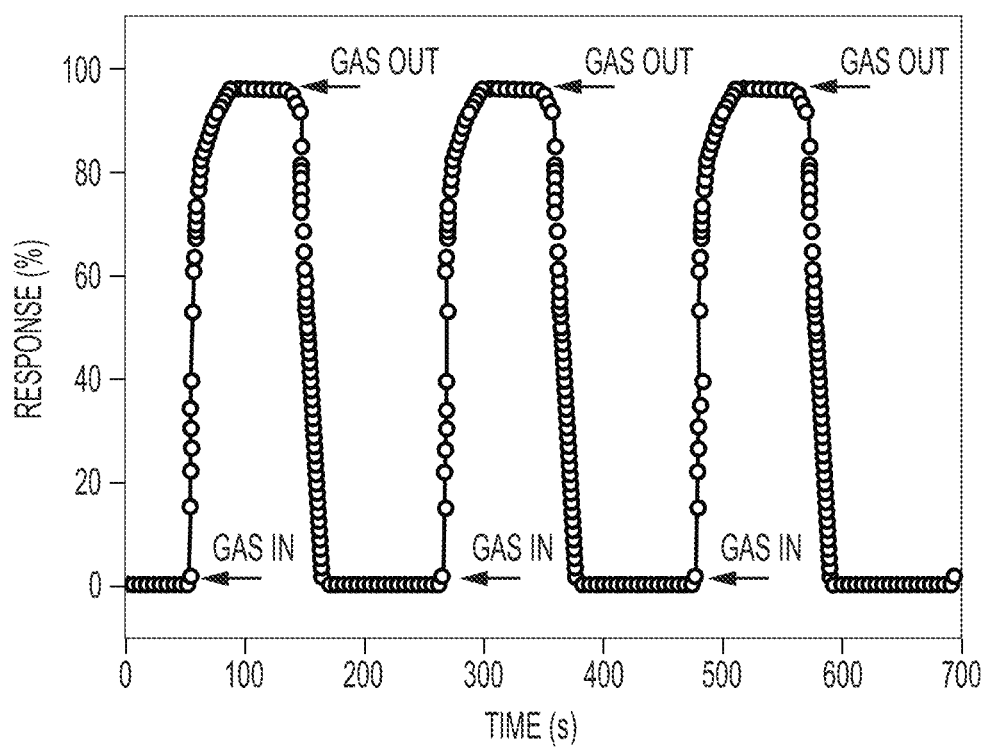
Figure 3F:
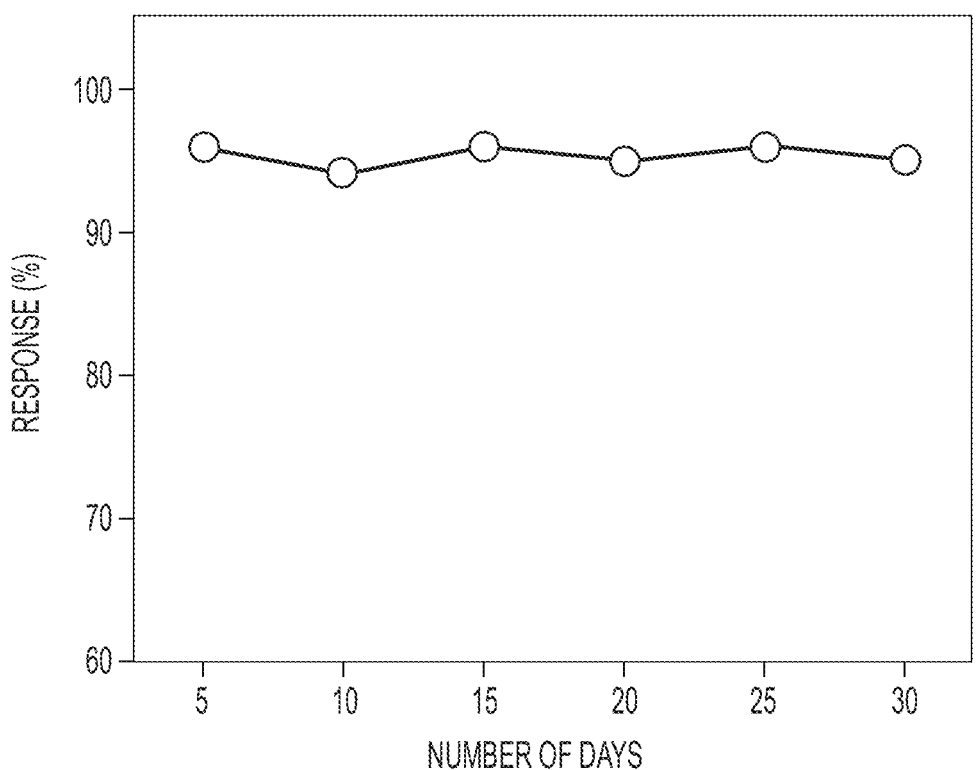

During room-temperature testing of the HUC NPs sensor, it demonstrated better sensitivity towards i.e. 90-98% rather than to the various other test gases as shown in FIG. 3B. The transient methanol response of the HUC NPs sensor performed at room-temperature is shown in FIG. 3C, where response/recovery was noted as a function of time. The ultra-fast response/recovery time for methanol is 30-40/30-35s, suggesting the use of the HUC NPs sensor as a high potential room-temperature gas sensor. Furthermore, the sensor studied for several concentrations at the low temperature i.e. 27-30° C. as shown in FIG. 3D endows the lowest methanol detected limit of 1-4% for 5-10 ppm. The highest methanol response for 80-100 ppm concentration is 90-100%. The repeatability is a most important factor in gas sensor studies, so, on using the HUC NPs sensor as in FIG. 3E approximately the same methanol performance over several cycles showing a dynamic repeatability is confirmed. The stability plot of the HUC NPs sensor for methanol sensor towards 80-100 ppm concentrations studied for 5-30 days is nearly constant (See FIG. 3F), suggesting the commercial potential of the HUC NPs gas sensor.

Example 3

OER Measurement

Figure 4A:
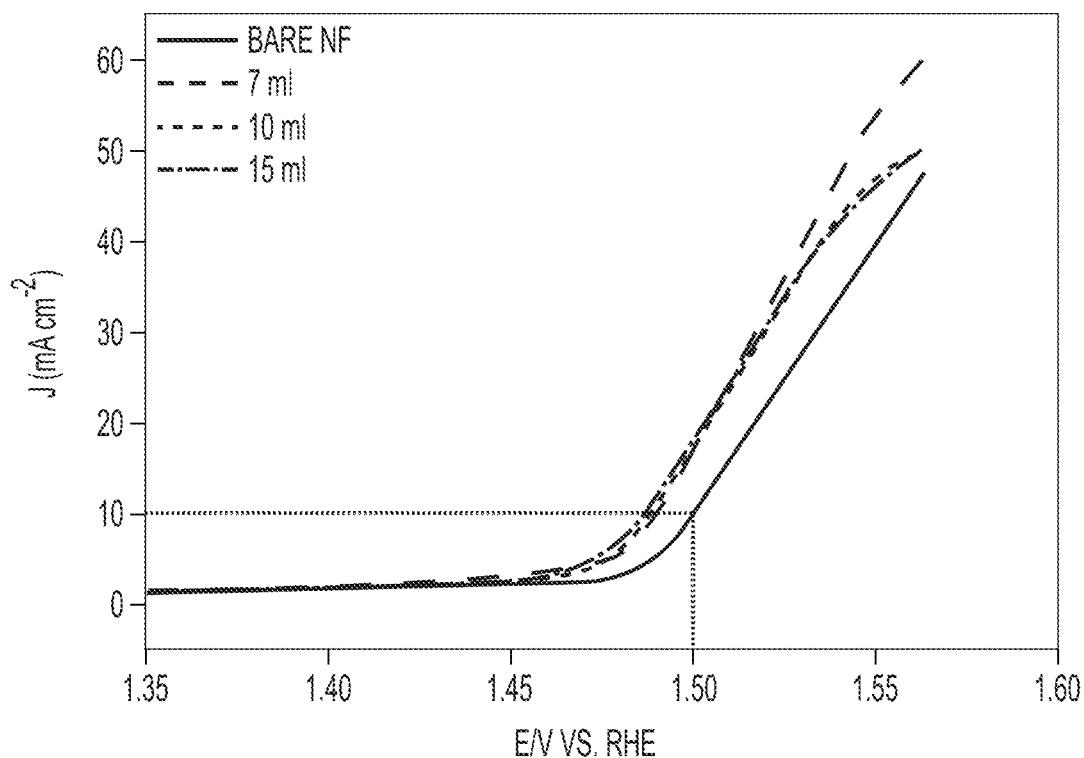
FIGS. 4A-4D depict the HUC NPs' (4A) polarization curve, with 240-300 mV overpotentials at constant 10 mV $s^{-1}$, (4B) OER Tafel plots, (4C) the EIS spectra with an equivalent circuit used for fitting Nyquist plots, and (4D) the long-term electrochemical stability of HUC NPs for the electrolysis of water oxidation.
Figure 4B:
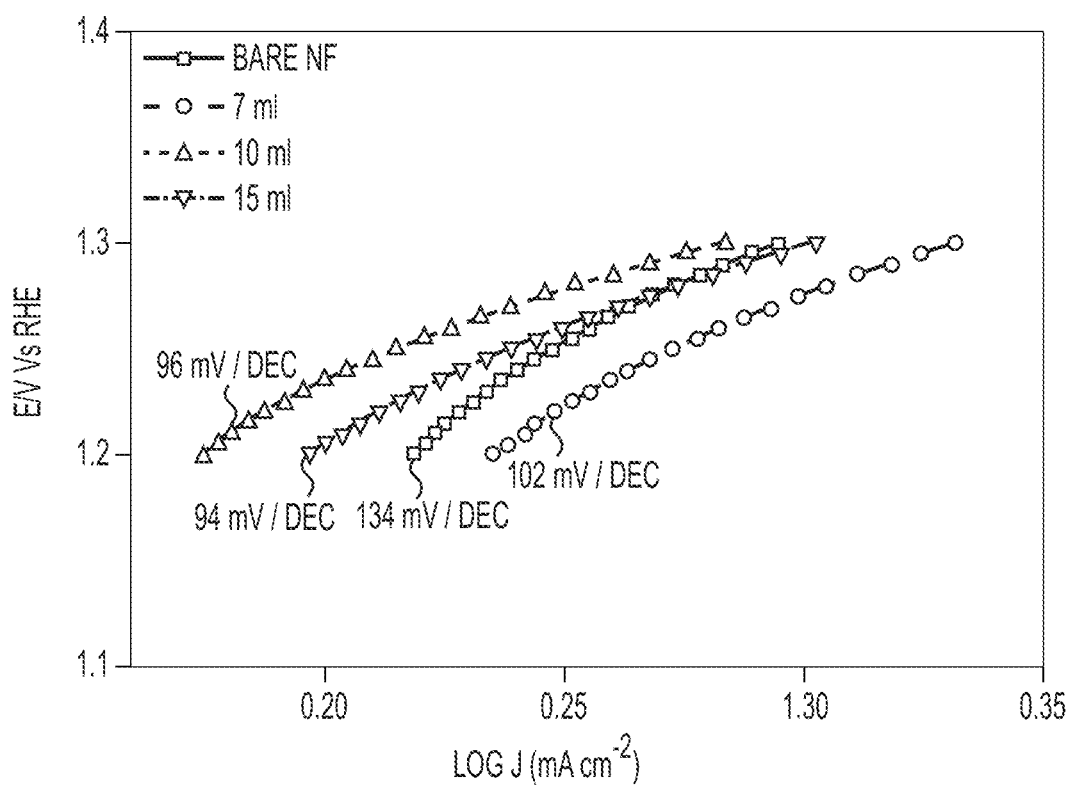
Figure 4C:
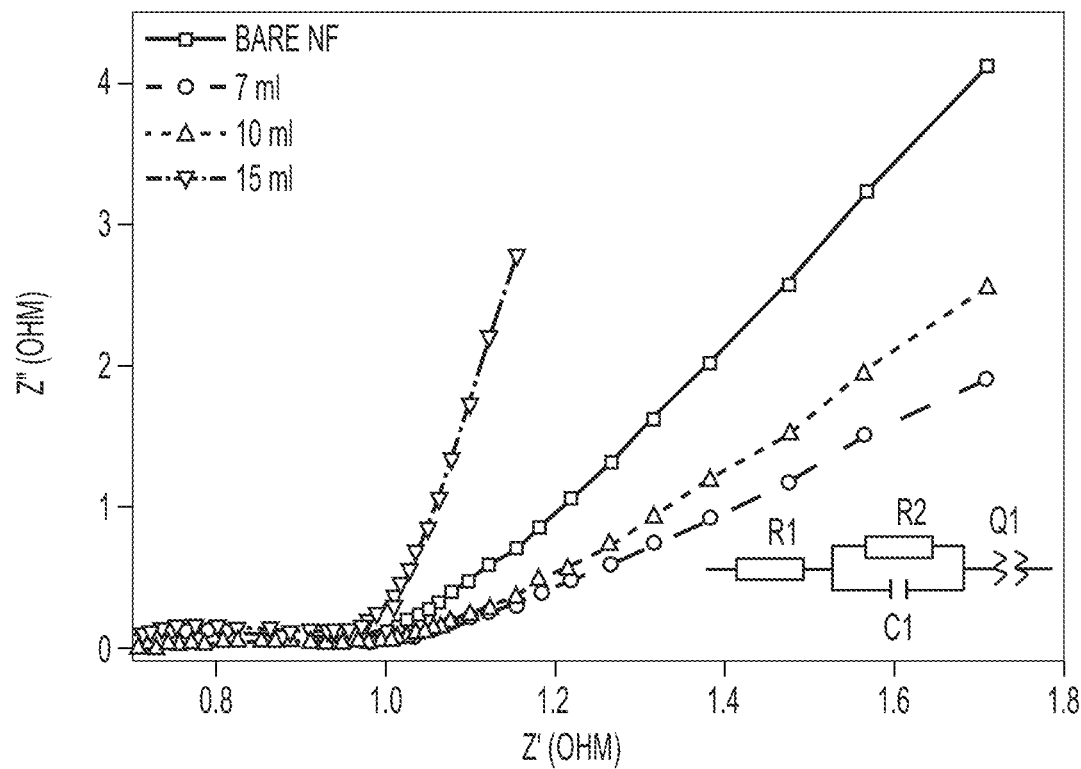
Figure 4D:
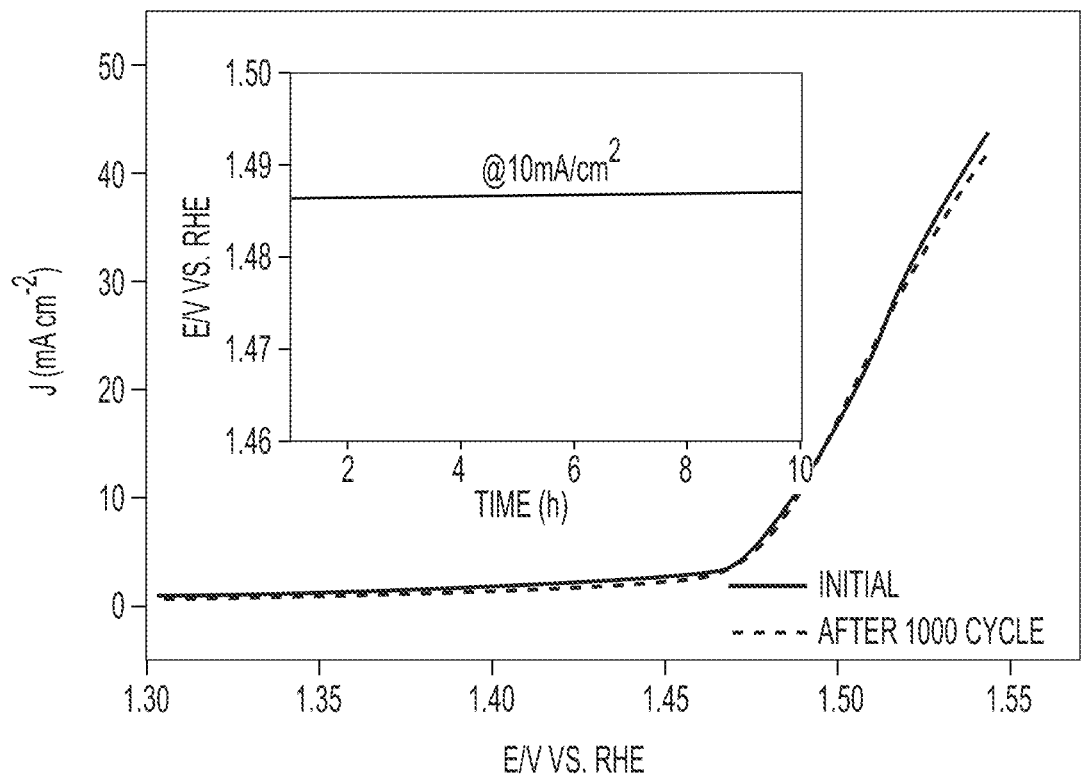
Figure 5:
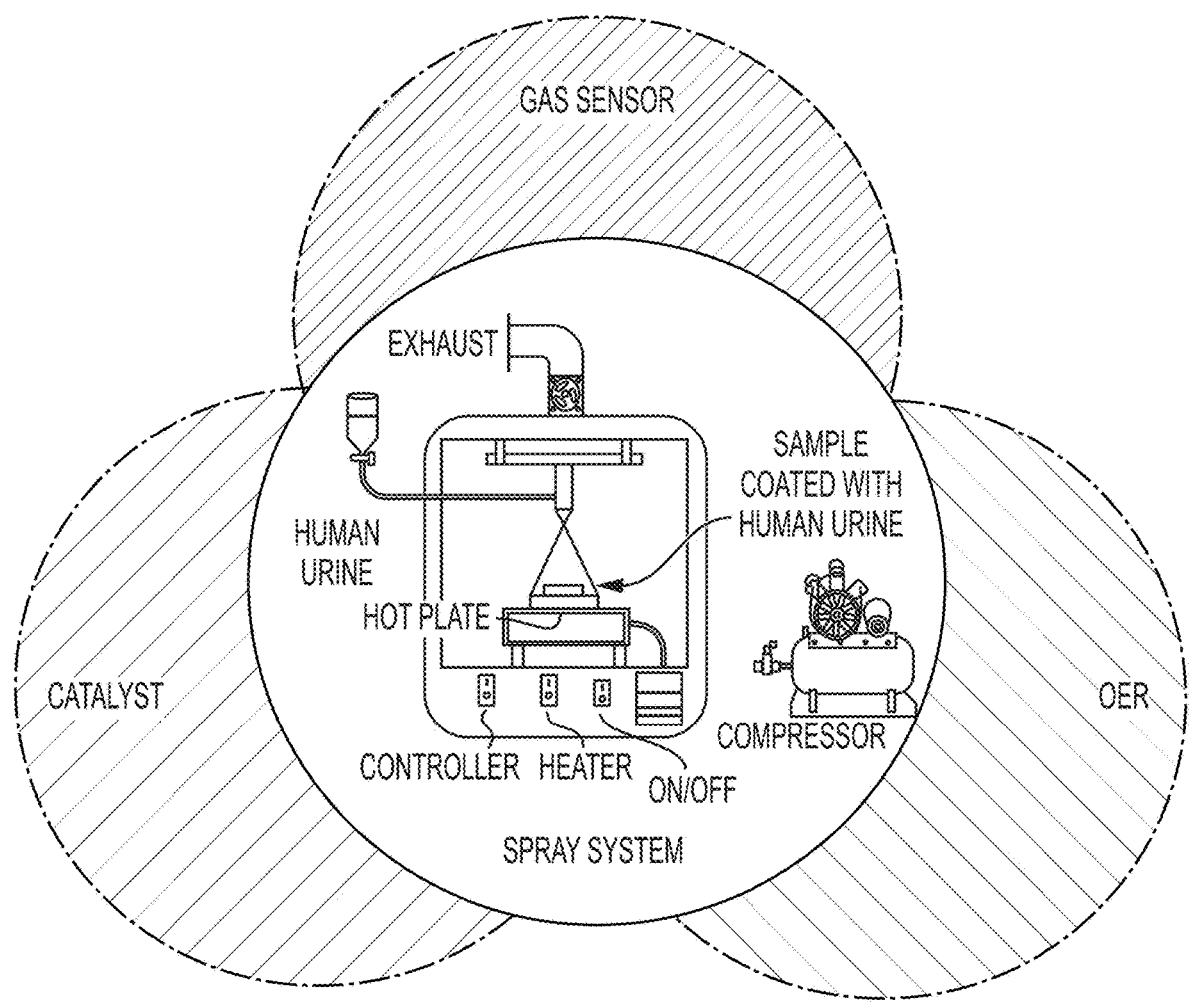
FIG. 5 depicts an illustration of synthesizing the HUC NPs and their utilization in various applications.

The as-prepared HUC NPs on nickel foam were envisaged for OER catalytic activity in aqueous 1 M KOH solution measured through the three-electrode system at different sweep rates from 10 to 50 mV s$^{-1}$ where Linear sweep voltammetry curve directly calculated over-potentials (n) of catalysts is 240-260 mV (FIG. 4A). At constant current density i.e. 10-15 mA cm$^{-2}$ of HUC NP-based electrocatalysts shows a lower y than the others. The Tafel plot confirms the influence of potential/over potential on constant current density (FIG. 4B). The Nyquist plot is obtained with the help of electrochemical impedance spectroscopy with an equivalent circuit (FIG. 4C). Finally, electrochemical durability is obtained at static current density i.e. 10-15 mA cm$^{-2}$ of HUC NPs catalyst, as shown in FIG. 4D demonstrates moderate sustainability.

Example 4

Catalytic Activity Measurement

The HUC NPs were utilized for the synthesis of chromene derivatives as a catalyst. The catalytic activity of HUC NPs has been assessed for the synthesis of chromene derivatives in ethanol as a green solvent under ambient conditions at room-temperature environments, producing high yields (>95%), of the appropriate products. The chemical process of 4-hydroxycoumarin with 3-chlorobenzaldehyde and malononitrile has been preferred as a prototypical reaction for exploratory catalytic activity (See Reaction Scheme 1). The reaction between 4-hydroxycoumarin, 3-bromobenzaldehyde as well as malononitrile along with the catalyst has been performed. The prevailing evolution is eco-friendly as well as simple synthesis of chromene derivatives with catalyst recyclability with a high yield of desired products (>95%), and a less reaction time of 3-6 h in ethanol, as a green solvent.

Reaction Scheme 1

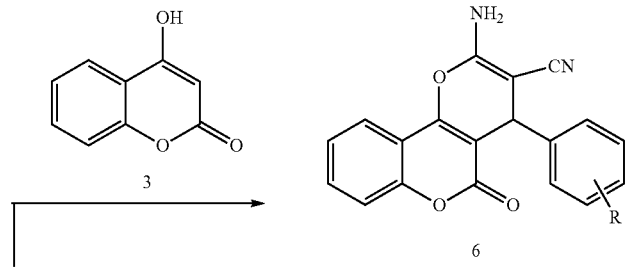

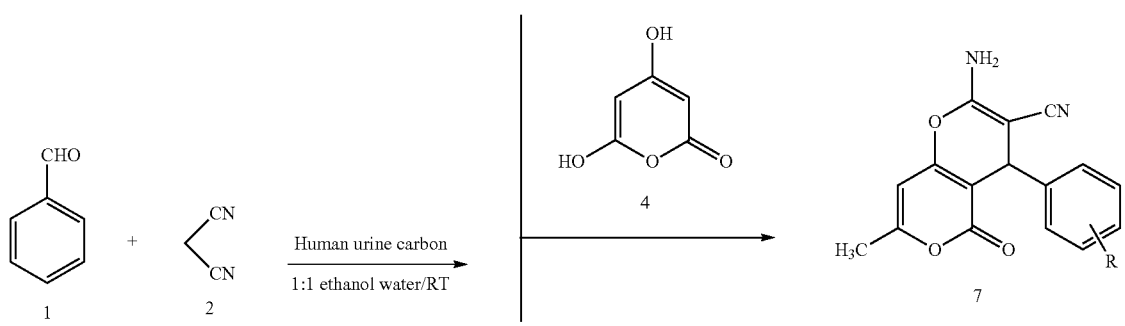

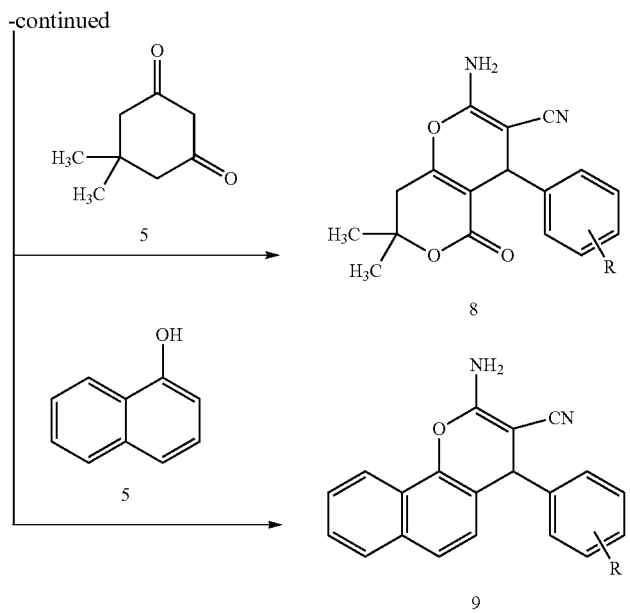

The invention claimed is:

1. A method of catalyzing a multi-element reaction to produce a chromene derivative comprising mixing carbon nanoparticles with 4-hydroxycoumarin, 3-chlorobenzaldehyde, and malononitrile, the carbon nanoparticles being prepared by a method, comprising:
   providing a human urine sample and a substrate;
   ultrasonically cleaning the substrate;
   using spray pyrolysis to spray the human urine sample onto the substrate at a temperature between about 100° C. and about 400° C. to obtain a film deposited on the substrate;
   allowing the film deposited on the substrate to cool to about 27° C.; and
   carbonizing the film deposited on the substrate at a temperature between about 300° C. and about 500° C. to obtain the carbon nanoparticles.

2. The method of claim 1, wherein the substrate is a conducting substrate.

3. The method of claim 2, wherein the conducting substrate is nickel-foam.

4. The method of claim 3, comprised ultrasonically cleaning the substrate for about 30 minutes sequentially in 1M hydrochloric acid, followed by distilled water and methanol.

5. The method of claim 1, wherein the substrate is a non-conducting substrate.

6. The method of claim 5, wherein the non-conducting substrate is soda-lime glass.

7. The method of claim 6, comprising ultrasonically cleaning the substrate for about 30 minutes sequentially in detergent-added distilled water and acetone.

8. The method of claim 1, comprising using spray pyrolysis to spray between about 5 mL and about 20 mL of the human urine sample onto the substrate at a temperature between about 100° C. and about 400° C. to obtain the film deposited on the substrate.

9. The method of claim 1, comprising spraying the human urine sample through a nozzle positioned about 20 to about 30 cm from the substrate.

10. The method of claim 1, wherein the spray pyrolysis is performed using an airflow rate of between about 15 to about 20 liters per minute.

11. The method of claim 1, wherein the spray pyrolysis is performed for a period of about 5 to about 7 minutes; wherein the carbon nanoparticles form a film layer adhered to the substrate; and wherein the film layer has a thickness of about 1 to about 10 microns.

12. The method of claim 1, wherein the carbon nanoparticles are deposited on a soda-lime glass substrate and have a thickness of 1-10 microns.

13. The method of claim 1, wherein the carbon nanoparticles consist of carbon, potassium, sodium, oxygen, and sulphur.

14. The method of claim 1, wherein the carbon nanoparticles are mesoporous with an average pore size of about 45.03 Å and a specific surface area of about 1238 $m^2g^{-1}$.

* * * * *